May 30, 1967        M. J. LOWY        3,321,826

METHOD OF MAKING METAL SANDWICH STRUCTURES

Filed Nov. 12, 1964        2 Sheets-Sheet 1

INVENTOR.
MORTIMER J. LOWY
BY Robert O. Richardson
ATTORNEY.

INVENTOR
MORTIMER J. LOWY
BY Robert O. Richardson
ATTORNEY

United States Patent Office 3,321,826
Patented May 30, 1967

3,321,826
METHOD OF MAKING METAL SANDWICH
STRUCTURES
Mortimer J. Lowy, Downey, Calif., assignor to Douglas
Aircraft Company, Inc., Santa Monica, Calif.
Filed Nov. 12, 1964, Ser. No. 410,641
8 Claims. (Cl. 29—423)

This invention relates to a method of making a metal sandwich panel structure. More particularly, this invention relates to a method of incorporating the fitting into the structure.

According to prior art teaching, lightweight, stiff panel structures having useful properties at elevated temperatures may be made in accordance with the roll-weld method employing titanium and the like. In producing such sandwich structures by this method, two metals are chosen which possess different physical or chemical properties so that they react differently in a given environment. This permits removal of one metal under certain conditions without damaging the other metal. For example, two metals may be used which have different rates of dissolution in a common solvent so that one of the metals will be etched away before the other. A sandwich panel having a core of corrugated metal or vertical ribs may be manufactured by this method. For example, a panel having the same material, such as titanium, for the core and the face sheets may be made first by inserting the core between the two faces. Spacers or matrix bars, are of a different material from that of the core and face sheets. This material is soluble in the etching solvent, and is employed as spacer material between the components forming the core. The sandwich panel thus formed, is then encased between cover sheets and a surrounding yoke. This yoke comprises side supports and end supports, preferably of the same material as the filler bars and cover sheets. This yoke is inserted adjacent the sides of the cover sheets or between them, and welded thereto. The pack thus formed is rolled to a desired thickness at an elevated temperature so that the core becomes bonded to the face sheets, forming a continuous bond along the entire length of the core. After rolling, the cover sheets and yoke are removed, leaving a composite structure complete with the soluble spacer material. The spacer material is then removed, such as by immersing the entire composite in a solvent which will dissolve the spacer material but not the core and face sheets.

One disadvantage with these and other sandwich structures resides in the fact that they are difficult to attach to other structures. Neither the core nor the face sheets constitute a satisfactory attachment means.

In view of the foregoing factors and conditions characteristic of lightweight, stiff sandwich panels having useful properties at elevated temperatures and the prior art methods of manufacturing such panels, it is one object of the present invention to provide a new and improved method of fabricating a panel not subject to the disadvantages enumerated above and having a termination fitting or attachment means forming an integral part of the panel.

Another object lies in the method of manufacturing such a panel efficiently, safely and expeditiously.

Another object of the present invention is to provide a new and improved method of manufacturing sandwich panels.

Yet another object of the present invention is to provide a new and improved method of installing end fittings in structural panels of the sandwich type.

A further object of the present invention is to provide a method of incorporating a termination fitting into a panel of the type described which incorporates a solid section within a panel in such a manner that stress concentrations occasioned by an abrupt change from the panel skins to the solid section are alleviated.

According to one aspect of the present invention, a sandwich structure or panel of the type described is provided with a region of solid material at the end of the panel as an integral part thereof. The solid material may be machined to form various configurations of end attachment members. This is accomplished by cutting the soluble spacers or matrix bars short of the end of the pack and substituting bars of the same cross section as the matrix bars, but made of the same material as the basic sandwich. The soluble matrix bars are later removed, leaving a region in which the substitution was made of solid, basic sandwich material. The removable matrix bars may be dovetailed into the basic material bar in the transition region, thereby providing a more gradual change in geometry in this region to minimize stress concentrations occasioned by an abrupt change from the panel skins to the solid section. The packs then may be laid up and welded in accordance with the previously described roll-weld method.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
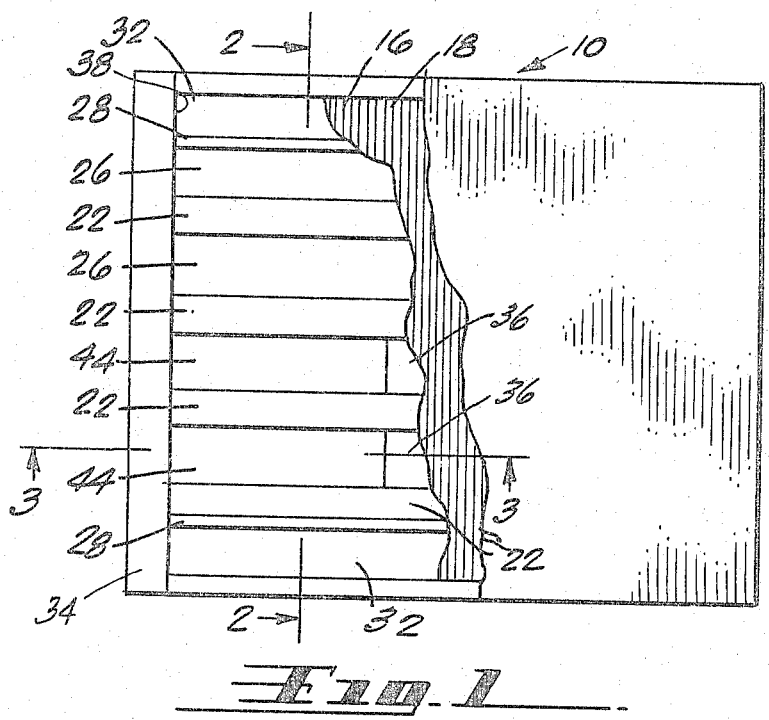
FIGURE 1 is a plan view of a pack containing a sandwich panel assembled in accordance with the method of the present invention, with a portion of the top face sheet removed.
Figure 2:
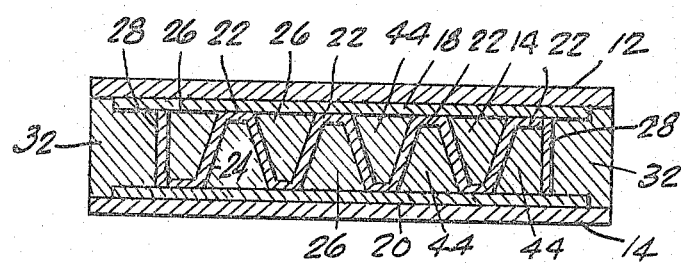
FIGURE 2 is a cross-sectional view taken along line 2—2 of FIGURE 1.
Figure 3:
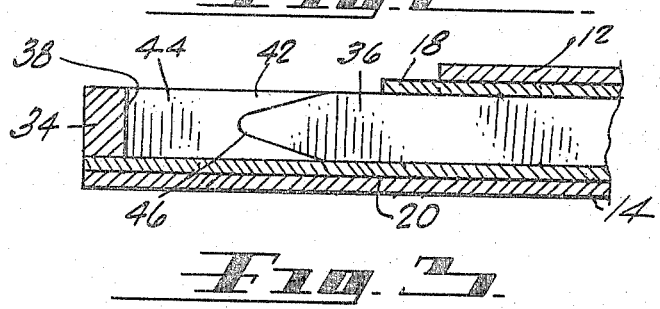
FIGURE 3 is a partial, cross-sectional view taken along line 3—3 of FIGURE 1.

Referring again to the drawings, an initial composite pack 10 is assembled for fabrication into a roll-weld sandwich. The pack 10 includes cover sheets 12, 14 between which is placed a sandwich panel 16. This panel consists of face sheets 18, 20 with core 22 interconnecting them. This core is corrugated, having a multiplicity of ribs 24 and vertical end stiffeners 28. The face sheets 18, 20 and the core 22 are made from a suitable material, such as titanium, which may be roll-welded at elevated temperatures in accordance with known techniques. A multiplicity of spacers or matrix bars 26 are placed between the ribs 24 and the vertical stiffeners 28. The matrix bars 26 are made from a material, such as low carbon steel, which is soluble in a solvent such as nitric acid in time/concentrations combinations which will not dissolve the titanium material. The core 22 and the matrix bars 26 are maintained in position between the face sheets 18 and 20 by a yoke 30 having side supports 32 and end supports 34. The supports 32 and 34 may be made of the same material as the cover sheets 12, 14 or of a different material with about the same deformation resistance. After assembly, the cover sheets 12, 14 are welded to the supports 24 and 26 to produce a completely enclosed pack 10.

Figure 4:
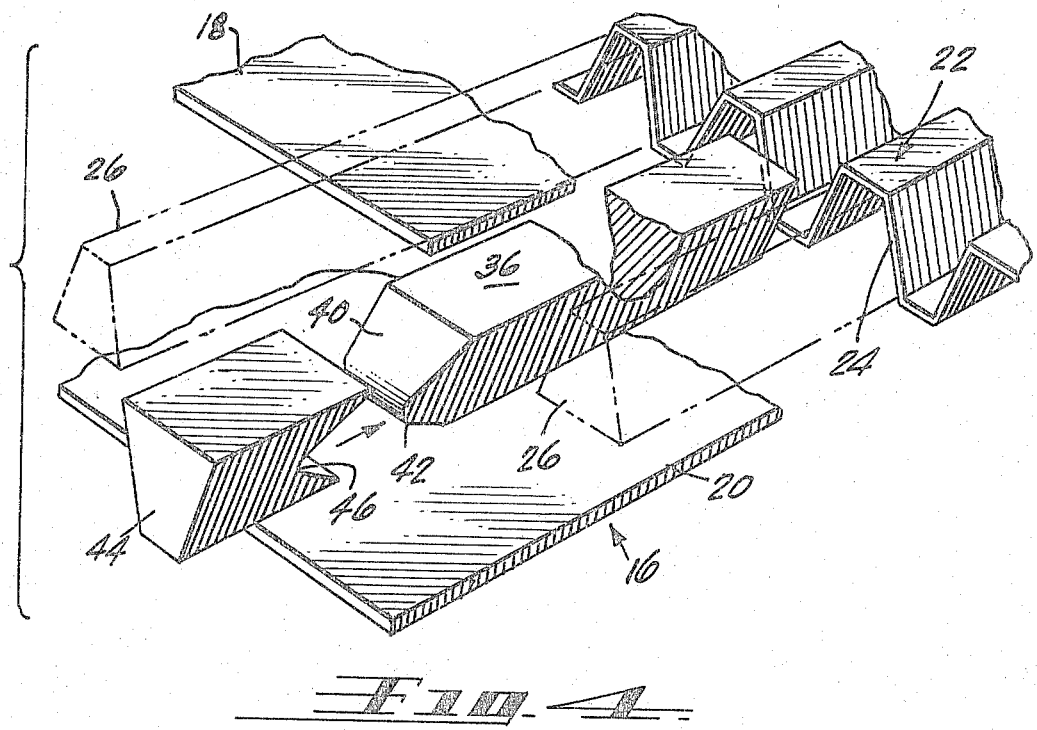
FIGURE 4 is an exploded, perspective view of a portion of the panel of FIGURE 1.
Figure 5:
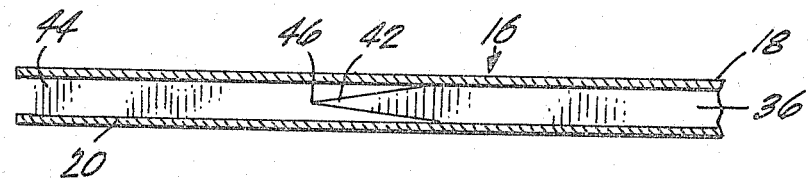
FIGURE 5 is a view similar to FIGURE 3, with the cover sheets removed, showing the parts after the panel of FIGURE 3 has been roll-welded in accordance with the present invention.
Figure 6:
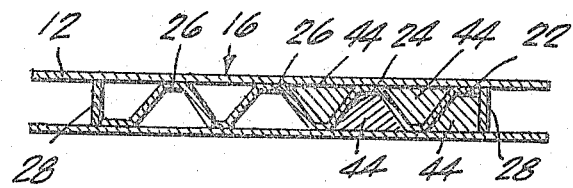
FIGURE 6 is a view similar to FIGURE 2, with the cover sheets and yoke removed, showing the panel after it has been manufactured in accordance with the method of the present invention.

Some of the matrix bars, identified by the numeral 36, terminate short of the end 38 of pack 10 and have their ends 40 (FIGURE 4) formed with a male notch 42. The space between the notch 42 and the end 38 is then filled with a matrix bar 44 which is made of the same or similar material as the face sheets 18, 20 so that it will readily bond thereto during the roll-welding operation and resist the later removal operation. Each matrix bar 44 is provided with a female notch 46 which engages an associated male notch 42.

After the pack 10 is assembled as above described, it is rolled at an elevated temperature to the desired thickness during which time the core 22 is bonded to the face sheets 18, 20 forming a continuous bond along the entire length of the core 22. This side and end supports 32, 34 and cover sheets 12, 14 are removed, leaving the composite sandwich panel with the soluble matrix bars 26 and 36. In this condition, the composite panel may be formed into shapes by bending or other forming operation, or it may be desired to use it as as a flat panel. When the panel is in the shape desired for use, the soluble matrix bars 26 and 36 are leached out by immersing the entire pack 10 in a solvent which will dissolve them but not the matrix end bars 44, the face sheets 18 and 20, or the core 22. After dissolving the soluble matrix bars 26 and 36, the panel is ready for use. The matrix end bars 44 are firmly bonded to the face sheets 18 and 20 and the core 22 as an integral part thereof. Thus, the sandwich panel is now in the desired form and the end bars 44 constitute a termination fitting for attaching the panel to other panels or structures. The continuous bond between the face sheets 18 and 20, the core 22 and the matrix end bars 44 is produced by the combination of heat and pressure during the rolling operation.

The present invention may be further illustrated by the following example:

A pack 10 was prepared with 8-1-1 titanium-alloy core 22 and face sheets 18, 20. A steel cover sheet 14 was first placed on an assembly table. Face sheet 20 was next positioned. Three Ti-6A1-4V alloy matrix bars 44 were placed on the face sheet at end 38. The bars 44 were machined to the same dimensions as the steel matrix bars 26 and 36. A 90° female notch was machined at one end of each bar 44. A male notch was then machined on the associated steel matrix bars 36 to match the notch in the titanium bars 44. The steel bars 36 were then mated to the titanium bars 44 in the pack assembly 10 to insure a tight fit during fabrication. The top face sheet 18 was next positioned, over which cover sheet 20 was used to close the pack. The side and end supports 32 and 34, were welded in place to make the pack air tight. The pack 10 was next evacuated and then rolled at 1800° Fahrenheit to a total reduction of 60%. Both the panel geometry and bonding were excellent. The titanium bars 44 were bonded completely to the ribs 24 of core 22 and face sheets 18 and 20 to form an integral unit. After rolling, the panel had a thickness of 0.250 inch, a length of 5 inches and a width of 3½ inches.

After removal of the cover sheets 12, 14, side and end supports 32 and 34, respectively, the steel was dissolved out of the panel by heating in warm (approximately 200° Fahrenheit) nitric acid (70% $HNO_3$).

While the particular roll-weld termination fitting and method of manufacturing the same herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:
1. A method of producing hollow, metal sandwich structures of controlled dimensions and with a uniform continuous bond between a core member, a termination fitting and a pair of cover sheets comprising the steps of:
   assembling in a metal yoke at least two different metals in contiguous relationship, one metal being said core member having a plurality of ribs and another being a plurality of spacers, said spacers being suitable for selective chemical etching and being placed between said ribs;
   assembling in said metal yoke a metallic termination fitting, said termination fitting being placed in one end of said yoke and occupying a space normally occupied by one end of at least one of said spacers;
   attaching top and bottom metal cover sheets to said yoke to form a metal sandwich;
   hot rolling said metal sandwich to form a continuous bond between said core, said termination fitting and said metal sheets; and
   selectively removing said spacers from between the top and bottom metal sheets.

2. The method of claim 1 wherein said spacers are removed by chemical etching.

3. The method of claim 2 wherein said sheets, said core and said termination fitting comprise a titanium alloy.

4. The method of claim 2 wherein said spacers comprise a copper metal.

5. The method of claim 2 wherein said core member and said termination fitting are of the same metal.

6. The method of claim 2 wherein said spacers comprise a steel metal.

7. The method of claim 6 wherein said metal sandwich is rolled to a 60% reduction at 1800° F.

8. The method of claim 7 wherein said spacers are etched away with nitric acid solution.

References Cited

UNITED STATES PATENTS

| | | | |
|---|---|---|---|
| 2,047,555 | 7/1936 | Gardner | 29—423 X |
| 2,851,770 | 9/1958 | Fromson | 29—423 |
| 3,044,160 | 7/1962 | Jaffee | 29—423 |

JOHN F. CAMPBELL, *Primary Examiner.*

THOMAS H. EAGER, *Examiner.*